(12) United States Patent
Maeng et al.

(10) Patent No.: US 11,328,354 B1
(45) Date of Patent: May 10, 2022

(54) SYSTEMS AND METHODS FOR TOKENIZATION AND API SERVICES

(71) Applicant: Wells Fargo Bank, N.A., San Francisco, CA (US)

(72) Inventors: Joon Maeng, Newcastle, WA (US); Ximing Zhao, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 184 days.

(21) Appl. No.: 15/977,078

(22) Filed: May 11, 2018

(51) Int. Cl.
*G06Q 40/00* (2012.01)
*G06Q 40/02* (2012.01)
*G06Q 50/16* (2012.01)
*H04L 9/08* (2006.01)

(52) U.S. Cl.
CPC ........... *G06Q 40/025* (2013.01); *G06Q 50/16* (2013.01); *G06Q 2220/00* (2013.01); *H04L 9/0861* (2013.01)

(58) Field of Classification Search
USPC .................................................... 705/35, 38
See application file for complete search history.

(56) References Cited

U.S. PATENT DOCUMENTS

| | | | |
|---|---|---|---|
| 6,438,526 B1 * | 8/2002 | Dykes ................ | G06Q 30/0601 705/35 |
| 7,548,884 B1 * | 6/2009 | Thomas ............. | G06Q 30/0623 705/38 |
| 7,680,728 B2 | 3/2010 | Lazerson | |
| 8,108,303 B2 | 1/2012 | Moran | |
| 8,145,556 B2 | 3/2012 | Tealdi et al. | |
| 8,204,788 B1 | 6/2012 | Ivankovich et al. | |
| 8,489,498 B1 | 7/2013 | Flaxman et al. | |
| 8,751,391 B2 | 6/2014 | Freund | |
| 8,768,827 B1 * | 7/2014 | Bradford, III ....... | G06Q 40/025 705/38 |

(Continued)

FOREIGN PATENT DOCUMENTS

| CA | 2853403 A1 | 12/2014 |
|---|---|---|
| WO | 2001/027832 A1 | 4/2001 |

OTHER PUBLICATIONS

Leman, Pre-Approvals Are Tricky, Oct. 1, 2006, Ward's Dealer Business; Overland Park, 1-9, 40/10, https://www.wardsauto.com/news-analysis/pre-approvals-are-tricky, Aug. 13, 2018.

*Primary Examiner* — William E Rankins
(74) *Attorney, Agent, or Firm* — Womble Bond Dickinson (US) LLP

(57) ABSTRACT

Systems, apparatuses, methods, and computer program products are disclosed for preapproving a loan. An example method includes receiving, from an online marketplace server device, a preapproval request provided by a user for a loan preapproval to purchase a first property. The example method further includes obtaining credit information associated with the user from a credit server device. The example method further includes generating a preapproval data structure based on the preapproval request and the credit information. The example method further includes generating a preapproval token based on the generated preapproval data structure. Subsequently, the example method includes transmitting the generated preapproval token to the online marketplace server device.

20 Claims, 3 Drawing Sheets

(56) References Cited

U.S. PATENT DOCUMENTS

| | | | |
|---|---|---|---|
| 2002/0069151 A1* | 6/2002 | Casper | G06Q 40/04 705/37 |
| 2003/0033241 A1 | 2/2003 | Harari | |
| 2004/0199458 A1 | 10/2004 | Ho | |
| 2007/0067234 A1 | 3/2007 | Beech | |
| 2009/0048953 A1* | 2/2009 | Hazel | G07F 7/1008 705/35 |
| 2011/0276395 A1 | 9/2011 | Gaton et al. | |
| 2013/0066736 A1 | 3/2013 | Bennett et al. | |
| 2013/0339217 A1 | 12/2013 | Breslow et al. | |
| 2014/0278827 A1 | 9/2014 | Trailer | |
| 2014/0365387 A1 | 12/2014 | Kiaman et al. | |
| 2015/0039490 A1 | 2/2015 | Forrester et al. | |
| 2015/0213443 A1 | 7/2015 | Geffon et al. | |
| 2015/0235310 A1* | 8/2015 | Rozman | G06Q 40/025 705/38 |
| 2015/0269666 A1 | 9/2015 | Swierczek | |
| 2016/0035053 A1* | 2/2016 | Gerhardt | G06F 21/64 705/316 |
| 2016/0104180 A1* | 4/2016 | Desautels | G06Q 30/0203 705/7.32 |
| 2016/0125528 A1* | 5/2016 | Brown | G06Q 40/025 705/38 |
| 2016/0171555 A1 | 6/2016 | Buerger et al. | |
| 2016/0239836 A1* | 8/2016 | von Mueller | G06Q 20/204 |
| 2017/0124640 A1* | 5/2017 | Stumbo | G06F 16/25 |
| 2017/0235901 A1* | 8/2017 | Johnson | G16H 40/63 705/2 |
| 2018/0158138 A1* | 6/2018 | Busevs | G06Q 40/025 |

* cited by examiner

SYSTEMS AND METHODS FOR TOKENIZATION AND API SERVICES

TECHNOLOGICAL FIELD

Example embodiments of the present disclosure relate generally to tokenization and application programming interface (API) services and, more particularly, to systems and methods for tokenization and API services for loan preapproval.

BACKGROUND

Many people use online marketplaces to shop for and buy houses, cars, airplanes, boats, and other real and personal property. For example, while driving through a residential neighborhood, a potential buyer may use a smartphone to access an online real estate marketplace and receive information regarding a particular house for sale, including pictures of the house and the house's price, size, features, and neighborhood characteristics. If the potential buyer is interested in the house, the potential buyer may contact a financial institution, request a preapproval for a loan to purchase the house, receive a preapproval letter from the financial institution, and make an offer to purchase the house that references the preapproval letter. Typically, this process is time consuming and requires multiple oral and written communications between the potential buyer and the financial institution. In many instances, the potential buyer may have to repeat the entire process multiple times before obtaining the preapproval and purchasing the house.

BRIEF SUMMARY

Systems, apparatuses, methods, and computer program products are disclosed herein for providing preapprovals for loans in the form of preapproval tokens. The loan preapproval system provided herein solves the above problems by generating a preapproval token comprising a data structure with a price range and a size range for loans preapproved for a potential buyer and transmitting the preapproval token to an online marketplace for facilitating the potential buyer's purchase offers and loan requests.

In one example embodiment, a computing system is provided for preapproving loans. The computing system may comprise application programming interface (API) circuitry configured to receive, from an online marketplace server device, a preapproval request provided by a user for a loan preapproval to purchase a first property. The preapproval request may comprise user information and first property information comprising a first property price and first property characteristics. The computing system may further comprise credit score interface circuitry configured to obtain, from a credit server device, credit information associated with the user. The credit information may comprise at least one credit score associated with the user. The computing apparatus may further comprise preapproval token generation circuitry configured to generate a preapproval data structure based on the first property information, the user information, and the credit information. The preapproval data structure may comprise a preapproval property price range and a preapproval property size range. The preapproval token generation circuitry may be further configured to generate a preapproval token based on the generated preapproval data structure. The generated preapproval token may comprise at least a portion of the generated preapproval data structure. The API circuitry may be further configured to transmit the generated preapproval token to the online marketplace server device.

In another example embodiment, a computing apparatus is provided for preapproving loans. The computing apparatus may comprise API circuitry configured to receive, from an online marketplace server device, a preapproval request provided by a user for a loan preapproval to purchase a first property. The preapproval request may comprise user information and first property information comprising a first property price and first property characteristics. The computing apparatus may further comprise credit score interface circuitry configured to obtain, from a credit server device, credit information associated with the user. The credit information may comprise at least one credit score associated with the user. The computing apparatus may further comprise preapproval token generation circuitry configured to generate a preapproval data structure based on the first property information, the user information, and the credit information. The preapproval data structure may comprise a preapproval property price range and a preapproval property size range. The preapproval token generation circuitry may be further configured to generate a preapproval token based on the generated preapproval data structure. The generated preapproval token may comprise at least a portion of the generated preapproval data structure. The API circuitry may be further configured to transmit the generated preapproval token to the online marketplace server device.

In another example embodiment, a method is provided for preapproving loans. The method may comprise receiving, by API circuitry from an online marketplace server device, a preapproval request provided by a user for a loan preapproval to purchase a first property. The preapproval request may comprise user information and first property information comprising a first property price and first property characteristics. The method may further comprise obtaining, by credit score interface circuitry from a credit server device, credit information associated with the user. The credit information may comprise at least one credit score associated with the user. The method may further comprise generating, by preapproval token generation circuitry, a preapproval data structure based on the first property information, the user information, and the credit information. The preapproval data structure may comprise a preapproval property price range and a preapproval property size range. The method may further comprise generating, by the preapproval token generation circuitry, a preapproval token based on the generated preapproval data structure. The generated preapproval token may comprise at least a portion of the generated preapproval data structure. The method may further comprise transmitting, by the API circuitry to the online marketplace server device, the generated preapproval token.

In another example embodiment, a computer program product is provided for preapproving loans. The computer program product may comprise at least one non-transitory computer-readable storage medium having computer-executable program code stored therein. The computer-executable program code may comprise program code instructions that, when executed, may cause a computing system to receive, from an online marketplace server device, a preapproval request provided by a user for a loan preapproval to purchase a first property. The preapproval request may comprise user information and first property information comprising a first property price and first property characteristics. The program code instructions, when executed, may further cause the computing system to obtain, from a credit server device, credit information associated with the user. The credit information may comprise at least one credit score associated with the user. The program code instructions, when executed, may further cause the computing system to generate a preapproval data structure based on the first property information, the user information, and the credit information. The preapproval data structure may comprise a preapproval property price range and a preapproval property size range. The program code instructions, when executed, may further cause the computing system to generate a preapproval token based on the generated preapproval data structure. The generated preapproval token may comprise at least a portion of the generated preapproval data structure. The program code instructions, when executed, may further cause the computing system to transmit, to the online marketplace server device, the generated preapproval token.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
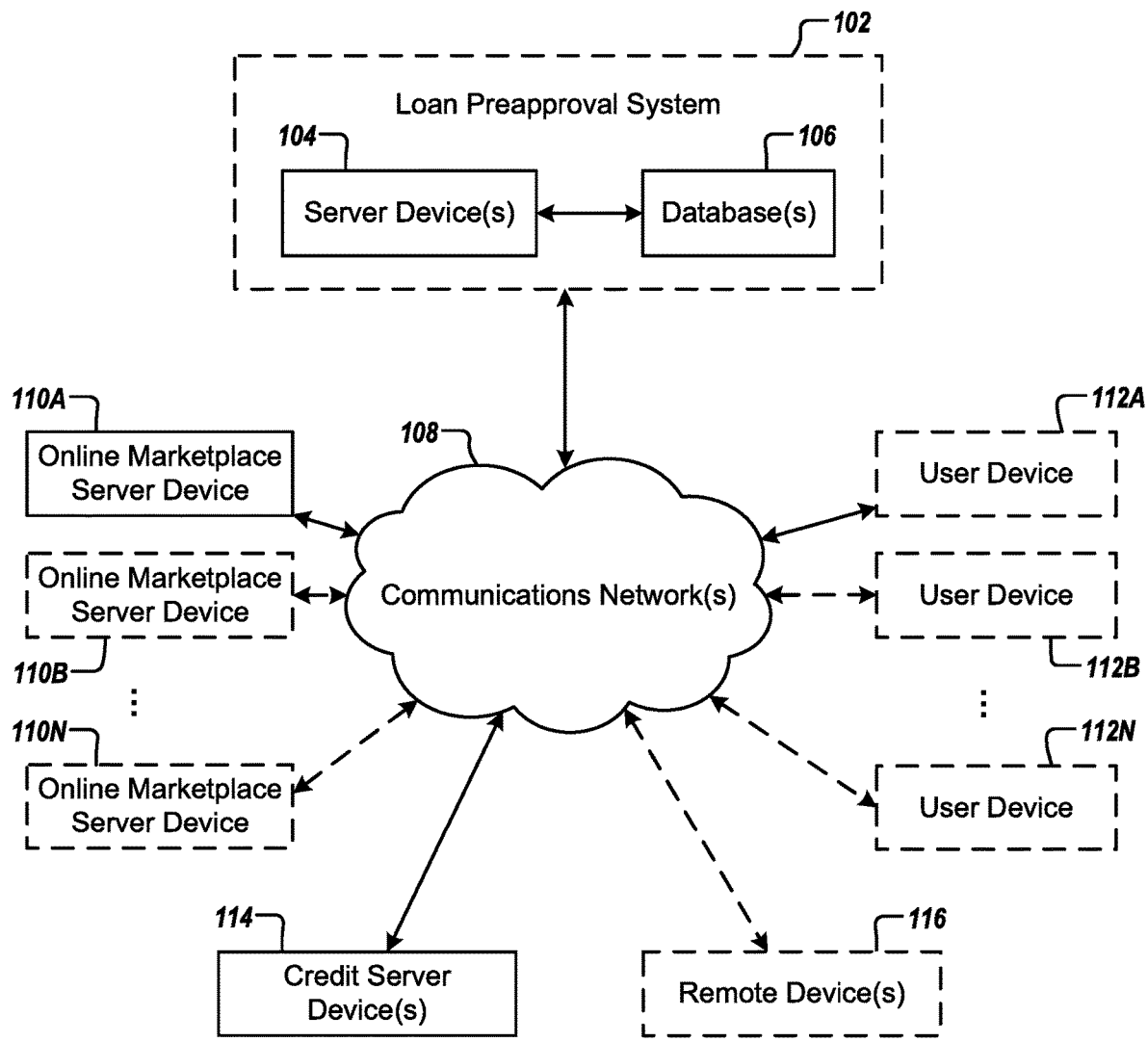
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide preapprovals for loans. Traditionally, the loan preapproval process has been time consuming and has required multiple written and oral communications between potential purchasers and financial institutions. Potential buyers are often required to repeat the entire loan preapproval process multiple times before receiving preapproval for a loan to purchase property. Accordingly, the inventors have identified a latent need for a system facilitating a quicker and more streamlined process for preapproving loans for potential purchasers.

In some embodiments, the present disclosure relates to a loan preapproval system for providing preapprovals for loans (e.g., mortgage loans, consumer loans) to purchase property (e.g., real property, personal property). In general, the loan preapproval system may receive, from an online marketplace server device, a preapproval request provided by a user for a loan to purchase property. The loan preapproval system may obtain credit information associated with the user from a credit server device and generate a preapproval data structure based on the credit information and other information, such as user information and property information contained in the preapproval request. The loan preapproval system then may generate a preapproval token based on the preapproval data structure, and encrypt and transmit the generated preapproval token to the online marketplace server device, the user device, or both. The user may use the preapproval token to make an offer to purchase the property. In some instances, the user may use the preapproval token to make an offer to purchase another property that meets the criteria of the preapproval token. Subsequently, the user may use the preapproval token in requesting a loan to purchase the property.

In some embodiments, the present disclosure relates to a loan preapproval system for generating and using a virtual loan preapproval token for real estate purchase negotiations. For example, the loan preapproval system receives a preapproval request through an API from a potential buyer who is browsing a list of properties at an online real estate marketplace website, where the preapproval request specifies property information and buyer information. The loan preapproval system determines whether a preapproval for a loan should be issued based on the buyer's information, property information, and buyer's creditworthiness. In response to a determination to issue a preapproval, the loan preapproval system generates and issues a tamper-proof preapproval token that may be input into an online real estate marketplace website, which in turn may identify a range of properties having qualifying prices and sizes. The online real estate marketplace website may show the properties to the buyer that meet the criteria of the preapproval token, and the buyer may make an offer with the preapproval token to the initial property or another property that meets the criteria of the preapproval token. In some embodiments, the seller may verify a target preapproval token's authenticity directly with the loan preapproval system. The target preapproval token may be an unverified preapproval token received with an offer to purchase property or a request for a loan.

There are many advantages of these and other embodiments described herein, such as: facilitating and streamlining the process of obtaining preapprovals for loans so that potential buyers may more quickly and easily obtain preapprovals while shopping for property (e.g., houses, boats, automobiles); providing verifiable preapproval tokens to prevent manipulation, tampering, and fraud; providing enhanced services to financial customers; and establishing service relationships between potential purchasers and financial institutions early in the shopping process.

Definitions

As used herein, the terms "data," "data structure," "content," "information," "request," "token," "verification," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," and "utility" (or other such terms) should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more online marketplace server devices, user devices, credit server devices, remote devices, or a combination thereof. Example embodiments of the user devices include any of a variety of stationary or mobile computing devices, such as a portable digital assistant (PDA), mobile telephone, smartphone, smartwatch, smart speaker, tablet computer, laptop computer, desktop computer, kiosk computer, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to generate, store, and retrieve preapproval tokens for loans. As illustrated, a loan preapproval system 102 may be connected to one or more server devices 104 in communication with one or more databases 106. The loan preapproval system 102 may be connected to one or more online marketplace server devices 110A-110N, one or more user devices 112A-112N, one or more credit server devices 114, and one or more remote devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the loan preapproval system 102 may be configured to generate a preapproval token in response to a preapproval request provided by an online marketplace server device 110 or a user device 112 as described in further detail below.

The loan preapproval system 102 may be embodied as one or more computers or computing systems and may comprise one or more server devices 104 and one or more databases 106. The one or more server devices 104 may be embodied as one or more servers, remote servers, cloud-based servers (e.g., cloud utilities), processors, any other suitable server devices, or any combination thereof. The one or more server devices 104 receive, process, generate, and transmit data, signals, and electronic information to facilitate the operations of the loan preapproval system 102. The one or more databases 106 may be embodied as one or more data storage devices, such as Network Attached Storage (NAS) devices or separate databases or servers. The one or more databases 106 include information accessed and stored by the loan preapproval system 102 to facilitate the operations of the loan preapproval system 102. For example, the one or more databases 106 may store user account credentials for users of one or more online marketplace server devices 110A-110N, one or more user devices 112A-112N, one or more credit server devices 114, one or more remote devices 116, or a combination thereof. In another example, the one or more databases 106 may store data regarding device characteristics of various online marketplace server devices 110A-110N, user devices 112A-112N, one or more credit server devices 114, one or more remote devices 116, or a combination thereof.

In some embodiments, the loan preapproval system 102 may provide for receiving a preapproval request provided by a user for a loan preapproval to purchase a first property. The loan preapproval system 102 may receive the preapproval request from various sources, including but not necessarily limited to the online marketplace server devices 110A-110N, the user devices 112A-112N, or both. In some embodiments, the preapproval request may comprise user information and first property information. In some embodiments, the user information may comprise the user's name, address information, employment information, income information, asset information, debt information, any other suitable user information, or any combination thereof. In some instances, the user information may be provided by an online marketplace server device 110 or a remote device 116 (e.g., a financial institution server device), input by the user using a user device 112, or a combination thereof. In some embodiments, the first property information may comprise a first property price and first property characteristics, such as the property's price, size (e.g., gross living area, lot size), features, price history, tax history, geolocation characteristics (e.g., neighborhood characteristics), any other suitable property information, or any combination thereof.

In some embodiments, the loan preapproval system 102 may provide for obtaining credit information associated with the user. The loan preapproval system 102 may receive the credit information from various sources, including but not necessarily limited to the credit server device 114, the user devices 112A-112N, or both. The credit information may comprise at least one credit score associated with the user, at least one credit report associated with the user, the user's available credit usage, the user's current debt, any other suitable credit information, or any combination thereof.

In some embodiments, the loan preapproval system 102 may provide for generating a preapproval data structure based on the first property information, the user information, and the credit information. The preapproval data structure may comprise various conditions indicative of the terms of the loan preapproval. In some embodiments, the preapproval data structure may comprise a preapproval property price range (e.g., a minimum preapproval property price and a maximum preapproval property price). In some embodiments, the preapproval data structure may also comprise a preapproval property size range (e.g., a minimum preapproval property gross living area and a maximum preapproval property gross living area; a minimum preapproval property lot size and a maximum preapproval property lot size). In some embodiments, the preapproval data structure may also comprise a preapproval property type range (e.g., one or more of single family houses, multifamily houses, townhomes, condominiums, vacant land, commercial real estate). In some embodiments, the preapproval data structure may also comprise a preapproval property geolocation range (e.g., one or more preapproval property cities; preapproval property ZIP codes; preapproval property neighborhoods; a predetermined commuting distance from the potential purchaser's place of employment). In some embodiments, the preapproval data structure may also comprise a preapproval time period (e.g., a date range, a timeout).

In some embodiments, the loan preapproval system 102 may provide for generating a preapproval token based on the generated preapproval data structure. The preapproval token may be, for example, a structured data indicative of the terms or conditions of the preapproval. In some embodiments, the preapproval token may comprise a private portion (e.g., an encrypted portion) and a public portion (e.g., a non-encrypted, publicly accessible portion describing characteristics of the data). In some embodiments, the preapproval token may be encrypted using a secret key. In some embodiments, the preapproval token may comprise a secret code, such as a unique number or a two-dimensional barcode, that the potential purchaser could input using a user device 112 when making a purchase offer or loan request. In some embodiments, the preapproval token may comprise a hash value of public and private data that may be used for verification by a financial institution. In some embodiments, the preapproval token may be one part of a preapproval data package generated by the loan preapproval system 102 based on the preapproval data structure.

In some embodiments, the generated preapproval token may comprise at least a portion of the generated preapproval data structure. In some embodiments, the data structure of the preapproval token may comprise various conditions indicative of the terms of the loan preapproval. For example, the preapproval token may comprise a maximum preapproval property price, or a preapproval property price range, that is within the preapproval property price range of the preapproval data structure. In another example, the preapproval property price range of the preapproval data structure may comprise a maximum preapproval property price, and the preapproval token may comprise an authorization for the user to purchase a property for a purchase price that is less than or equal to the maximum preapproval property price. In another example, the preapproval token may further comprise a minimum preapproval property size (e.g., a minimum preapproval property gross living area, a minimum preapproval property lot size, or both), or a preapproval property size range, that is within the preapproval property size range of the preapproval data structure. In another example, the preapproval token may further comprise a preapproval property type, or a set of preapproval property types, that is within the preapproval property type range of the preapproval data structure. In yet another example, the preapproval token may further comprise a preapproval property geolocation range, or a set of preapproval property addresses, that is within the preapproval property type range of the preapproval data structure. In still another example, the preapproval token may further comprise a preapproval time period or timeout that is within the preapproval time period of the preapproval data structure.

In some embodiments, the loan preapproval system 102 may provide for transmitting the generated preapproval token. The loan preapproval system 102 may transmit the generated preapproval token to various sources, including but not necessarily limited to the online marketplace server devices 110A-110N, the user devices 112A-112N, the remote devices 116, or a combination thereof. For example, the loan preapproval system 102 may transmit the generated preapproval token to the user device 112A. A user (e.g., a potential purchaser) may use user device 112A to upload the preapproval token to the online marketplace server device 110A, and the online marketplace server device 110A may generate and transmit a preapproval token verification request to the loan preapproval system 102. In this case, the preapproval token now may be referred to as a target preapproval token. The loan preapproval system 102 may determine whether the target preapproval token is valid (e.g., by comparing the target preapproval token's hash value to the hash value of the preapproval token generated by loan preapproval system 102). If the loan preapproval system 102 determines that the target preapproval token is valid, the loan preapproval system 102 may generate and transmit a preapproval token verification to the online marketplace server device 110A. In another example, the user device 112A may transmit the preapproval token to a second user device 112B. A user (e.g., a seller, a real estate agent) may use user device 112B to generate and transmit a preapproval token verification request to the loan preapproval system 102. If the loan preapproval system 102 determines that the target preapproval token is valid, the loan preapproval system 102 may generate and transmit a preapproval token verification to the user device 112B. In yet another example, the online marketplace server device 110A may request the preapproval token on behalf of the potential purchaser.

In some embodiments, the loan preapproval system 102 may provide for generating a first security key (e.g., a private key) and a second security key (e.g., a public key). In some embodiments, the loan preapproval system 102 may provide for encrypting the generated preapproval token using the first security key. In some embodiments, the loan preapproval system 102 may receive a target preapproval token from various sources, including but not necessarily limited to the online marketplace server devices 110A-110N, the user devices 112A-112N, the remote devices 116, or a combination thereof. In some embodiments, the loan preapproval system 102 may provide for decrypting the target preapproval token using the second security key to determine whether the target preapproval token is valid.

The one or more online marketplace server devices 110A-110N may be embodied by any suitable computing device. In some embodiments, the one or more online marketplace server devices 110A-110N may be embodied as one or more data storage devices, such as one or more NAS devices, or as one or more separate databases or database servers. In some embodiments, the one or more online marketplace server devices 110A-110N may be embodied as one or more servers, remote servers, cloud-based servers (e.g., cloud utilities), processors, or any other suitable devices, or any combination thereof. In some embodiments, the one or more online marketplace server devices 110A-110N may receive, process, generate, and transmit data, signals, and electronic information to facilitate the operations of the loan preapproval system 102. Information received by the loan preapproval system 102 from one or more online marketplace server devices 110A-110N may be provided in various forms and via various methods. It will be understood, however, that in some embodiments, the one or more online marketplace server devices 110A-110N need not themselves be databases or database servers, but may be peripheral devices communicatively coupled to databases or database servers. In some embodiments, the one or more online marketplace server devices 110A-110N may include or store various data and electronic information associated with one or more users and properties (e.g., properties for sale, recently sold properties, property valuations). For example, the one or more online marketplace server devices 110A-110N may include or store user information for one or more users of one or more online marketplace websites. In another example, the one or more online marketplace server devices 110A-110N may include or store property information for one or more properties through one or more online marketplace websites. In some embodiments, the one or more online marketplace server devices 110A-110N may be associated with one or more online marketplaces (e.g., online real estate marketplace, online airplane marketplaces, online boat marketplaces, or other online personal property marketplaces) or representatives thereof.

The one or more user devices 112A-112N may be embodied by any computing device known in the art. Information received by the loan preapproval system 102 from the one or more user devices 112A-112N may be provided in various forms and via various methods. For example, the one or more user devices 112A-112N may be laptop computers, smartphones, netbooks, tablet computers, wearable devices, desktop computers, electronic workstations, or the like, and the information may be provided through various modes of data transmission provided by these user devices. In some embodiments, the one or more user devices 112A-112N may include or store various data and electronic information associated with one or more users. For example, the one or more user devices 112A-112N may include or store user information, credit information, or both for one or more users. In some embodiments, the one or more user devices 112A-112N may be associated with one or more potential property purchasers or representatives thereof.

In embodiments where a user device 112 is a mobile device, such as a smartphone or tablet, the mobile device may execute an "app" (e.g., a thin-client application) to interact with the loan preapproval system 102, one or more online marketplace server devices 110A-110N, one or more credit server devices 114, one or more remote devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., online marketplace server devices, user devices, credit server devices, remote devices). Communication with hardware and software modules executing outside of the app is typically provided via APIs provided by the mobile device operating system.

The one or more credit server devices 114 may be embodied by any suitable computing device. In some embodiments, the one or more credit server devices 114 may be embodied as one or more data storage devices, such as one or more NAS devices, or as one or more separate databases or database servers. In some embodiments, the one or more credit server devices 114 may be embodied as one or more servers, remote servers, cloud-based servers (e.g., cloud utilities), processors, or any other suitable devices, or any combination thereof. In some embodiments, the one or more credit server devices 114 may receive, process, generate, and transmit data, signals, and electronic information to facilitate the operations of the loan preapproval system 102. Information received by the loan preapproval system 102 from one or more credit server devices 114 may be provided in various forms and via various methods. It will be understood, however, that in some embodiments, the one or more credit server devices 114 need not themselves be databases or database servers, but may be peripheral devices communicatively coupled to databases or database servers. In some embodiments, the one or more credit server devices 114 may include or store various data and electronic information associated with the creditworthiness of one or more users. For example, the one or more credit server devices 114 may include or store credit information for one or more users. In some embodiments, one or more credit server devices 114 may be associated with one or more credit reporting agencies or representatives thereof.

The one or more remote devices 116 may be embodied by any suitable computing device. Information received by the loan preapproval system 102 from the one or more remote devices 116 may be provided in various forms and via various methods. For example, the one or more remote devices 116 may be servers, databases, computing devices, or the like, and the information may be provided through various modes of data transmission provided by these remote devices. In some embodiments, the one or more remote devices 116 may include or store various data and electronic information associated with one or more offers to purchase property. For example, the one or more remote devices 116 may include or store target preapproval tokens received from users in association with offers to purchase property. In some embodiments, one or more user devices 112A-112N may be associated with one or more potential property purchasers or representatives thereof, and one or more remote devices 116 may be associated with one or more property sellers or representatives thereof.

Additionally or alternatively, the one or more online marketplace server devices 110A-110N, the one or more user devices 112A-112N, the one or more credit server devices 114, the one or more remote devices 116, or any combination thereof may interact with the loan preapproval system 102 over one or more communications networks 108. As yet another example, the one or more online marketplace server devices 110A-110N, the one or more user devices 112A-112N, the one or more credit server devices 114, and the one or more remote devices 116 may include various hardware or firmware designed to interface with the loan preapproval system 102. For example, an example online marketplace server device 110A may be a database server modified to communicate with the loan preapproval system 102, and another example online marketplace server device 110B may be a purpose-built device offered for the primary purpose of communicating with the loan preapproval system 102. As another example, an example user device 112A may be a user's smartphone and may have an application stored thereon facilitating communication with the loan preapproval system 102, whereas another example user device 112B may be a purpose-built device (e.g., a kiosk computing device) offered for the primary purpose of communicating with the loan preapproval system 102.

Example Implementing Apparatus

Figure 2:
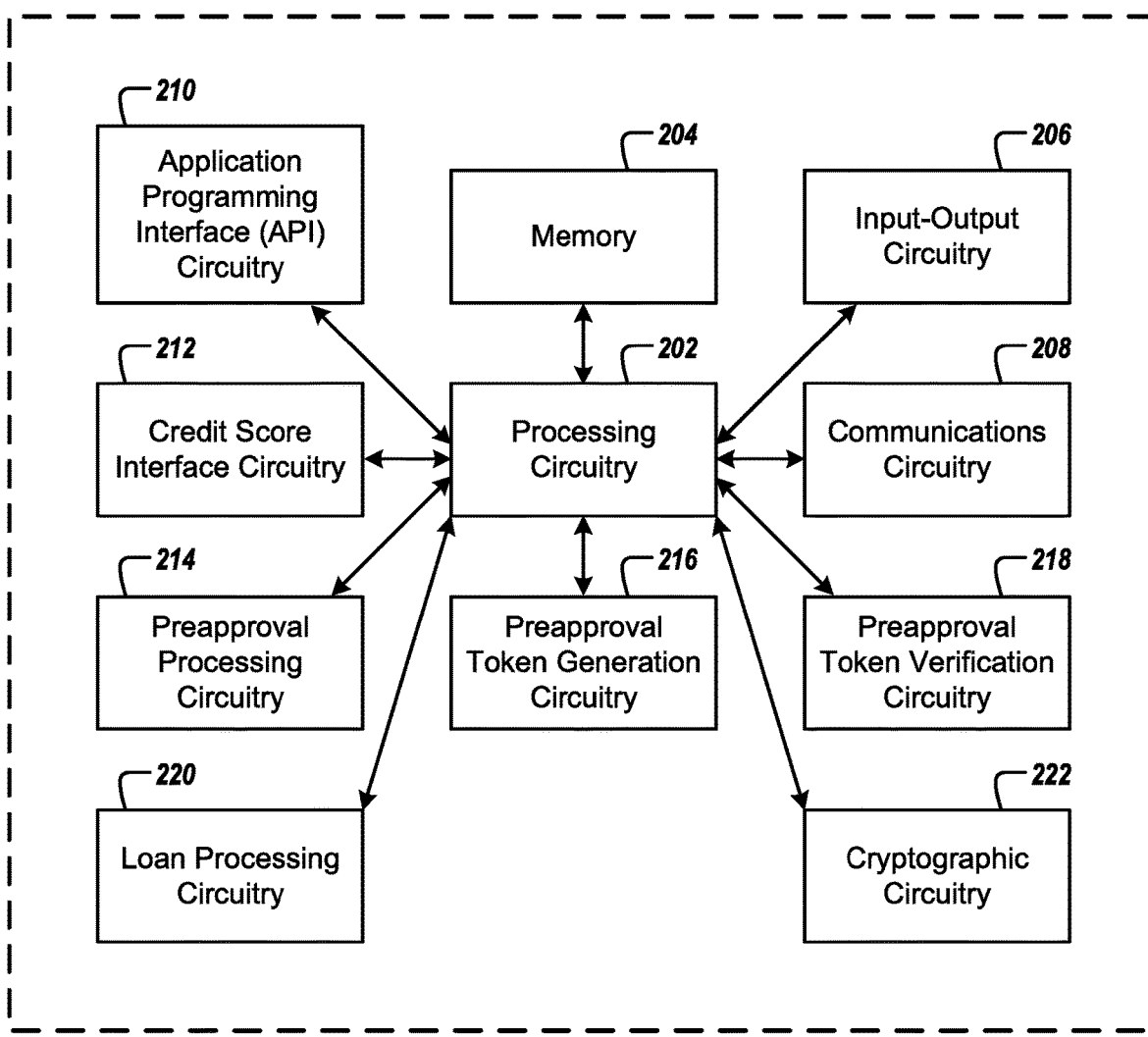
FIG. 2 illustrates a schematic block diagram of example circuitry that may perform various operations in accordance with some example embodiments described herein.

The loan preapproval system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, API circuitry 210, credit score interface circuitry 212, preapproval processing circuitry 214, preapproval token generation circuitry 216, preapproval token verification circuitry 218, loan processing circuitry 220, and cryptographic circuitry 222. The apparatus 200 may be configured to execute the operations described above with respect to FIG. 1 and below with respect to FIG. 3. Although some of these components 202-222 are described with respect to their functional capabilities, it should be understood that the particular implementations necessarily include the use of particular hardware to implement such functional capabilities. It should also be understood that certain of these components 202-222 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data and electronic information associated with one or more users and one or more properties. In some instances, the memory 204 may be configured to store preapproval requests provided by users for loan preapprovals to purchase various properties, user information and credit information associated with the users, and property information associated with the properties. In some instances, the memory 204 may be configured to store preapproval data structures, preapproval tokens, and sets of preapproval properties (e.g., properties for sale that meet the criteria of the preapproval tokens). In some instances, the memory 204 may be configured to store security keys, preapproval token verification requests, target preapproval tokens, preapproval token verifications, loan requests, and electronic approvals for loans. It will be understood that the memory 204 may be configured to store any electronic information, data, requests, data structures, tokens, verifications, approvals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface and may include a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The API circuitry 210 includes hardware components designed or configured to receive and transmit data, such as preapproval requests, preapproval tokens, sets of preapproval properties, preapproval token verification requests, target preapproval tokens, preapproval token verifications, loan requests, electronic approvals for loans, and other data or electronic information. In some embodiments, the API circuitry 210 may be in communication with a computing device (e.g., one or more online marketplace server devices 110A-110N, one or more user devices 112A-112N, one or more remote devices 116) and thus configured to receive a preapproval request provided by a user (e.g., a potential buyer) for a loan preapproval to purchase a first property from the computing device. In some instances, the preapproval request may comprise user information and first property information comprising a first property price and first property characteristics. In some embodiments, the API circuitry 210 may be further configured to transmit a preapproval token to the computing device.

In some embodiments, the API circuitry 210 includes hardware components designed or configured to receive, from the computing device, a set of preapproval properties whose respective property prices are within the preapproval property price range, and whose respective property sizes are within the preapproval property size range. In some embodiments, the API circuitry 210 may be configured to receive, from the computing device, a set of preapproval properties whose respective property information is near the criteria specified by the preapproval token (e.g., +/−10 percent of the preapproval property price range; +/−10 percent of the preapproval property size range; +/−2 miles geographically from the preapproval property geolocation range).

In some embodiments, the API circuitry 210 includes hardware components designed or configured to receive a preapproval token verification request comprising a target preapproval token from the computing device. In some instances, the preapproval token verification request may be provided by a second user, such as a property seller or representative thereof, for verification of the target preapproval token (e.g., in response to a transmission of an electronic offer from the first user to the second user, where the electronic offer comprises a target preapproval token). In some embodiments, the API circuitry 210 may be further configured to transmit a preapproval token verification to the computing device. In some embodiments, the API circuitry 210 may be further configured to receive, from the computing device, a set of preapproval properties whose respective property prices are within the preapproval property price range, and whose respective property sizes are within the preapproval property size range.

In some embodiments, the API circuitry 210 includes hardware components designed or configured to receive, from the computing device, a loan request provided by the user for a loan to purchase the first property or a second property different from the first property. In some embodiments, the loan request comprises the user information, a target preapproval token, and the first property information for the first property or second property information for the second property comprising a second property price and second property characteristics. In some embodiments, the API circuitry 210 may be further configured to transmit, to the computing device, an electronic approval for the loan to purchase the first property or the second property.

The credit score interface circuitry 212 includes hardware components designed or configured to receive and transmit data, such as credit information and other data. In some embodiments, the credit score interface circuitry 212 may be in communication with a computing device (e.g., one or more credit server devices 114, one or more user devices 112A-112N) and thus configured to obtain credit information associated with the user from the computing device. In some instances, the credit information comprises at least one credit score associated with the user. In one illustrative example, the credit score interface circuitry 212 may analyze the user information and transmit, to one or more credit server devices 114, a request for credit information associated with the user. In response, the one or more credit server devices 114 may transmit the credit information to the credit score interface circuitry 212, and the credit score interface circuitry 212 may receive the credit information associated with the user from the one or more credit server devices 114.

The preapproval processing circuitry 214 includes hardware components designed or configured to analyze and generate data, such as loan amounts, loan rates, and minimum down payments for loan preapprovals. In some embodiments, the preapproval processing circuitry 214 may be configured to determine whether to preapprove a loan based on the user information, the credit information, or both. In some embodiments, the preapproval processing circuitry 214 may be configured to determine whether to preapprove a loan further based on property information (e.g., price, size, features, location), neighborhood information (e.g., median house value, demographics, price fluctuations in zip code over time), or both. In some embodiments, the preapproval processing circuitry 214 may be configured to determine whether to preapprove a loan further based on the age of the property. In some embodiments, the preapproval processing circuitry 214 may be configured to determine whether to preapprove a loan further based on neighborhood or zip code weightings for various property characteristics (e.g., −50 percent in size or age may be acceptable for loan preapproval if the property is a single family house located in Palo Alto, Calif., instead of Charlotte, N.C.). In some embodiments, in response to a determination to preapprove a loan, the preapproval processing circuitry 214 may be configured to determine a loan rate and a minimum down payment based on the user information, the credit information, or both.

The preapproval token generation circuitry 216 includes hardware components designed or configured to analyze and generate data, such as preapproval data structures and preapproval tokens. In some embodiments, the preapproval token generation circuitry 216 may be configured to generate a preapproval data structure based on the first property information, the user information, the credit information, or a combination thereof. In some embodiments, the preapproval data structure may comprise a preapproval property price range and a preapproval property size range. In some embodiments, the preapproval token generation circuitry 216 may be configured to generate a preapproval token based on the generated preapproval data structure. In some embodiments, the generated preapproval token may comprise at least a portion of the generated preapproval data structure. In some embodiments, the preapproval token generation circuitry 216 may be configured to privately retain some portions of the preapproval data structure (e.g., the full range of preapproval prices and property characteristics). In some embodiments, the preapproval token generation circuitry 216 may be configured to publicly disseminate other portions of the preapproval data structure (e.g., an authorization to purchase house X for a price of Y). In some embodiments, the privately retained portions of the preapproval data structure may not be part of the preapproval token, but may be accessible by a computing device using the preapproval token, a security key, and/or credentials (e.g., the user's credentials, or the credentials of the online marketplace server). In some embodiments, the preapproval token generation circuitry 216 may be configured to generate the preapproval token based on the loan rate and the minimum down payment generated by the preapproval processing circuitry 214.

The preapproval token verification circuitry 218 includes hardware components designed or configured to analyze and generate data, such as preapproval token verification requests and target preapproval tokens. In some embodiments, the preapproval token verification circuitry 218 may be configured to determine whether a target preapproval token is valid. For example, the preapproval token verification circuitry 218 may be configured to determine whether a target preapproval token is valid by comparing the target preapproval token's hash value to the hash value of the preapproval token generated by preapproval token generation circuitry 216. In some embodiments, in response to a determination that the target preapproval token is valid, the preapproval token verification circuitry 218 may be configured to generate a preapproval token verification indicating that the target preapproval token is valid, has not been tampered with, or both. In some embodiments, in response to a determination that the target preapproval token is not valid, the preapproval token verification circuitry 218 may be configured to generate a preapproval token verification indicating that the target preapproval token is not valid, has been tampered with, or both. In some embodiments, the preapproval token verification circuitry 218 may be configured to determine whether the preapproval token has been used in connection with another offer and, if not, generate a preapproval token verification indicating that the target preapproval token is valid, has not been used in connection with another purchase offer, or both. If the preapproval token verification circuitry 218 determines the preapproval token has been used in connection with another offer, the preapproval token verification circuitry 218 may be configured to generate a preapproval token verification indicating that the target preapproval token is not valid, has been used in connection with another purchase offer, or both.

The loan processing circuitry 220 includes hardware components designed or configured to analyze and generate data, such as loan requests and electronic approvals for loans. In some embodiments, the loan processing circuitry 220 may be configured to analyze a loan request provided by the user for a loan to purchase the first property. In some embodiments, the loan request comprises the user information, a target preapproval token, and the first property information. In some embodiments, the loan processing circuitry 220 may be configured to determine whether the first property meets the criteria of the preapproval token. In some embodiments, in response to a determination that the target preapproval token is valid (e.g., a determination made by the preapproval token verification circuitry 218), and further in response to a determination that the first property meets the criteria of the preapproval token, the loan processing circuitry 220 may be configured to generate an electronic approval for the loan to purchase the first property.

The loan processing circuitry 220 may further include hardware components designed or configured to analyze a loan request provided by the user for a loan to purchase a second property different from the first property. The loan request may comprise the user information, a target preapproval token, and second property information comprising a second property price and second property characteristics. In some embodiments, the loan processing circuitry 220 may be configured to determine whether the preapproval property price range includes the second property price. In some embodiments, in response to a determination that the target preapproval token is valid (e.g., a determination made by the preapproval token verification circuitry 218), and further in response to a determination that the preapproval property price range includes the second property price, the loan processing circuitry 220 may be configured to generate an electronic approval for the loan to purchase the second property.

The loan processing circuitry 220 may further include hardware components designed or configured to analyze a set of preapproval properties whose respective property prices are within the preapproval property price range, and whose respective property sizes are within the preapproval property size range. In some embodiments, the loan processing circuitry 220 may be further configured to analyze a loan request provided by the user for a loan to purchase a second property. In some embodiments, the loan processing circuitry 220 may be further configured to determine whether the second property is in the set of preapproval properties. In some embodiments, in response to a determination that the second property is in the set of preapproval properties, the loan processing circuitry 220 may be further configured to generate an electronic approval for the loan to purchase the second property.

The cryptographic circuitry 222 includes hardware components designed or configured to generate security keys and encrypt and decrypt data. In some embodiments, the cryptographic circuitry 222 may be configured to generate a first security key (e.g., a private key) and a second security key (e.g., a public key). In some embodiments, the cryptographic circuitry 222 may be configured to encrypt the generated preapproval token using the first security key. In some embodiments, the cryptographic circuitry 222 may be in communication with a computing device (e.g., one or more online marketplace server devices 110A-110N, one or more user devices 112A-112N, one or more remote devices 116) and thus configured to receive a target preapproval token from the computing device. In some embodiments, the cryptographic circuitry 222 may be configured to decrypt the target preapproval token using the second security key.

It should also be appreciated that, in some embodiments, each of the API circuitry 210, credit score interface circuitry 212, preapproval processing circuitry 214, preapproval token generation circuitry 216, preapproval token verification circuitry 218, loan processing circuitry 220, and cryptographic circuitry 222 may include a separate processor, specially configured field programmable gate array (FPGA), application specific interface circuit (ASIC), or cloud utility to perform the above functions.

In some embodiments, the hardware components described above with reference to API circuitry 210, credit score interface circuitry 212, preapproval processing circuitry 214, preapproval token generation circuitry 216, preapproval token verification circuitry 218, loan processing circuitry 220, and cryptographic circuitry 222, may, for instance, utilize communications circuitry 208 or any suitable wired or wireless communications path to communicate with an online marketplace server device (e.g., one or more of online marketplace server devices 110A-110N), a user device (e.g., one or more of user devices 112A-112N), a credit server device (e.g., one or more of credit server devices 114), a remote device (e.g., one or more of remote devices 116), each other, or any other suitable circuitry or device.

In some embodiments, one or more of the API circuitry 210, credit score interface circuitry 212, preapproval processing circuitry 214, preapproval token generation circuitry 216, preapproval token verification circuitry 218, loan processing circuitry 220, and cryptographic circuitry 222 may be hosted locally by the apparatus 200. In some embodiments, one or more of the API circuitry 210, credit score interface circuitry 212, preapproval processing circuitry 214, preapproval token generation circuitry 216, preapproval token verification circuitry 218, loan processing circuitry 220, and cryptographic circuitry 222 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the API circuitry 210, credit score interface circuitry 212, preapproval processing circuitry 214, preapproval token generation circuitry 216, preapproval token verification circuitry 218, loan processing circuitry 220, and cryptographic circuitry 222.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The online marketplace server devices 110A-110N, user devices 112A-112N, credit server devices 114, and remote devices 116 may be embodied by one or more computing devices or systems that also may include processing circuitry, memory, input-output circuitry, and communications circuitry. For example, an online marketplace server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a user device 112 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data (e.g., electronic marketing information, business analytic data, or the like) with the loan preapproval system described herein.

Having described specific components of example devices involved in the present disclosure, example procedures for providing preapprovals for loans are described below in connection with FIG. 3.

Example Operations for Providing Preapprovals for Loans

Figure 3:
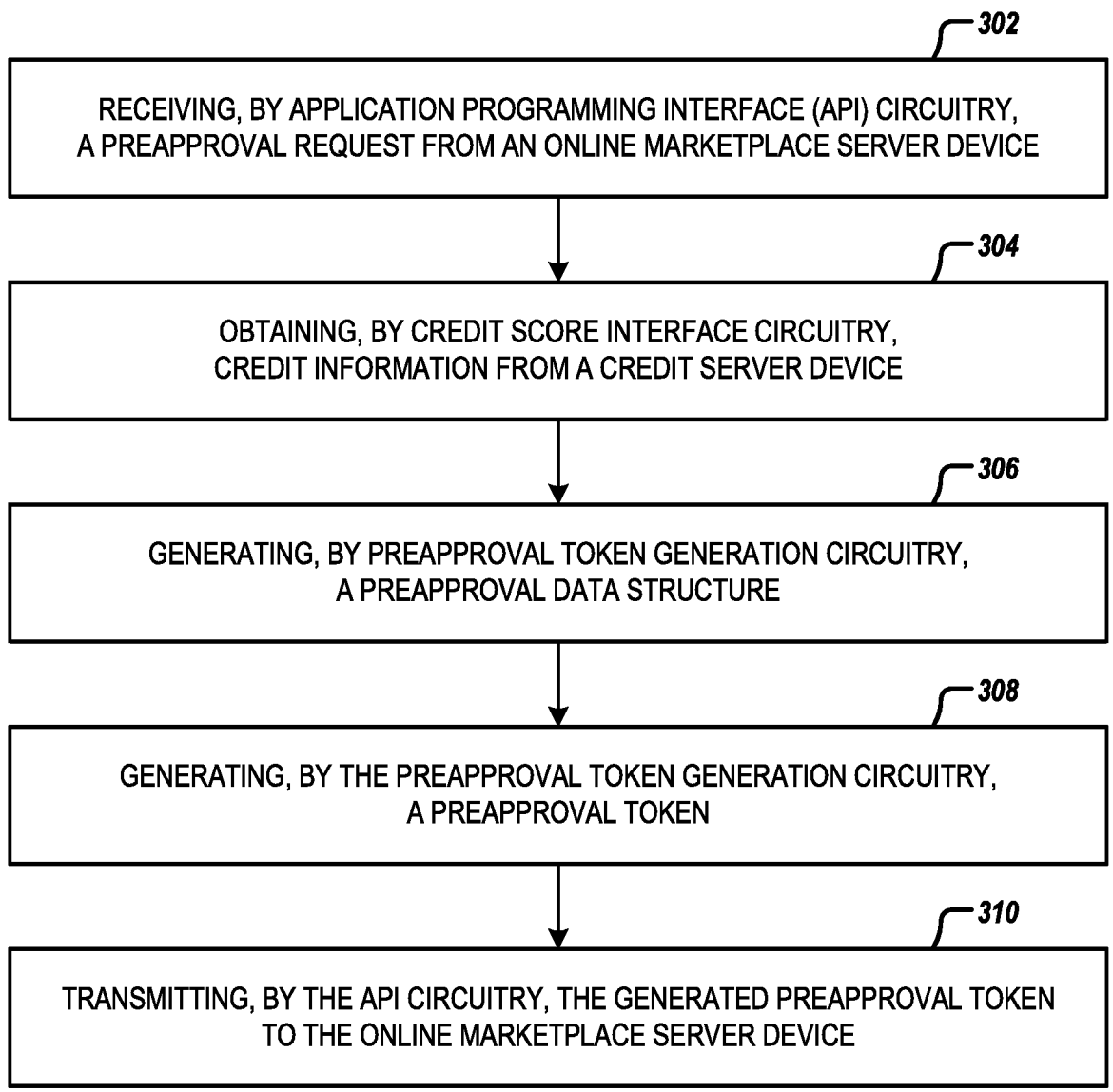
FIG. 3 illustrates an example flowchart for providing preapprovals for loans in accordance with some example embodiments described herein.

FIG. 3 illustrates an example flowchart 300 that contains example operations for providing preapprovals for loans according to an example embodiment. The operations illustrated in FIG. 3 may, for example, be performed by one or more components described with reference to loan preapproval system 102 shown in FIG. 1, by an online marketplace server device 110, a user device 112, a credit server device 114, or a remote device 116 in communication with loan preapproval system 102; by apparatus 200 shown in FIG. 2; or by any combination thereof. In some embodiments, the various operations described in connection with FIG. 3 may be performed by the apparatus 200 by or through the use of one or more of processing circuitry 202, memory 204, input-output circuitry 206, communications circuitry 208, API circuitry 210, credit score interface circuitry 212, preapproval processing circuitry 214, preapproval token generation circuitry 216, preapproval token verification circuitry 218, loan processing circuitry 220, cryptographic circuitry 222, any other suitable circuitry, and any combination thereof.

As shown by operation 302, the apparatus 200 includes means, such as API circuitry 210 or the like, for receiving a preapproval request provided by a user for a loan preapproval to purchase a first property. The preapproval request may comprise user information and first property information comprising a first property price and first property characteristics (e.g., property size, features, address, images, videos, price history, tax history, neighborhood characteristics). The user may have provided the preapproval request using a user device (e.g., user device 112), such as by selecting a selectable preapproval request icon. In some embodiments, the apparatus 200 may receive the preapproval request from an online marketplace server device (e.g., online marketplace server device 110), as described in more detail with reference to FIGS. 1 and 2. For example, the online marketplace server device may transmit the preapproval request to the API circuitry 210 of apparatus 200. In other embodiments, the apparatus 200 may receive the preapproval request from a user device (e.g., user device 112), as described in more detail with reference to FIGS. 1 and 2. For example, the user device may transmit the preapproval request to the API circuitry 210 of apparatus 200. In still other embodiments, the apparatus 200 may receive the preapproval request from the memory 204 of apparatus 200.

As shown by operation 304, the apparatus 200 includes means, such as the credit score interface circuitry 212 or the like, for obtaining credit information associated with the user. The credit information may comprise at least one credit score associated with the user. In some embodiments, the apparatus 200 may obtain the credit information from a credit server device (e.g., credit server device 114), as described in more detail with reference to FIGS. 1 and 2. For example, the credit score interface circuitry 212 of apparatus 200 may analyze the user information and transmit, to credit server device 114, a request for credit information associated with the user. In response, the credit score interface circuitry 212 may receive the credit information associated with the user from the credit server device 114. In other embodiments, the apparatus 200 may receive the credit information from a user device (e.g., user device 112), as described in more detail with reference to FIGS. 1 and 2. For example, the user device may transmit the credit information to the credit score interface circuitry 212 of apparatus 200. In still other embodiments, the apparatus 200 may receive the credit information from the memory 204 of apparatus 200.

As shown by operation 306, the apparatus 200 includes means, such as preapproval token generation circuitry 216 or the like, for generating a preapproval data structure based on the property information, the user information, and the credit information. The preapproval data structure may comprise a preapproval property price range (e.g., a minimum preapproval property price and a maximum preapproval property price). The preapproval data structure may also comprise a preapproval property size range (e.g., a minimum preapproval property gross living area and a maximum preapproval property gross living area; a minimum preapproval property lot size and a maximum preapproval property lot size). The preapproval data structure may also comprise a preapproval property type range (e.g., one or more of single family houses, multifamily houses, townhomes, condominiums, vacant land, commercial real estate). The preapproval data structure may also comprise a preapproval property geolocation range (e.g., one or more preapproval property neighborhoods; a predetermined commuting distance from the potential purchaser's place of employment).

As shown by operation 308, the apparatus 200 includes means, such as the preapproval token generation circuitry 216 or the like, for generating a preapproval token based on the generated preapproval data structure. The preapproval token may comprise at least a portion of the generated preapproval data structure. For example, the preapproval token may comprise a maximum preapproval property price, or a preapproval property price range, that is within the preapproval property price range of the preapproval data structure. In another example, the preapproval token may further comprise a minimum preapproval property size (e.g., a minimum preapproval property gross living area, a minimum preapproval property lot size, or both), or a preapproval property size range, that is within the preapproval property size range of the preapproval data structure. In another example, the preapproval token may further comprise a preapproval property type, or a set of preapproval property types, that is within the preapproval property type range of the preapproval data structure. In another example, the preapproval token may further comprise a preapproval property geolocation range, or a set of preapproval property addresses, that is within the preapproval property type range of the preapproval data structure. In another example, the preapproval token may further comprise a preapproval time period or timeout that is within the preapproval time period of the preapproval data structure.

As shown by operation 308, the apparatus 200 includes means, such as the API circuitry 210 or the like, for transmitting the generated preapproval token to the online marketplace server device. In embodiments in which the user directly interacts with the apparatus 200, the API circuitry 210 may transmit the generated preapproval token by producing a graphic, audio, or multimedia output of the generated preapproval token via input-output circuitry 206. In embodiments in which the user does not directly interact with the apparatus 200 (e.g., the apparatus 200 comprises a loan preapproval system 102, but the user interacts with an online marketplace server device 110 or a user device 112 that is in communication with the loan preapproval system 102), the API circuitry 210 may utilize means, such as communications circuitry 208, for transmitting the generated preapproval token. For example, the API circuitry may transmit the generated preapproval token to an online marketplace server device 110, a user device 112, or a remote device 116 for graphic, audio, or multimedia output via input-output circuitry of the online marketplace server device 110, the user device 112, or the remote device 116.

In some embodiments, operations 302, 304, 306, 308, and 310 may not necessarily occur in the order depicted in FIG. 3, and in some cases one or more of the operations depicted in FIG. 3 may occur substantially simultaneously, or additional steps may be involved before, after, or between any of the operations shown in FIG. 3.

As noted above, methods, apparatuses, systems, and computer program products are described herein that provide preapprovals for loans. By doing so, potential purchasers, potential sellers, and financial institutions are able to avoid the traditional problems surrounding loan preapproval. For instance, through performance of the above operations, a potential buyers can avoid multiple written and oral communications with a financial institution to obtain a preapproval for a loan. Instead, example embodiments described herein facilitate and streamline the process of obtaining a preapproval for a loan so that the potential buyer may more quickly and easily obtain a preapproval while shopping for property (e.g., houses, boats, automobiles). Moreover, in some embodiments, example embodiments described herein facilitate the establishment of a service relationship between the potential purchaser and the financial institutions early on in the property shopping process.

FIG. 3 thus illustrates a flowchart describing the operation of various systems (e.g., loan preapproval system 102 described with reference to FIG. 1), apparatuses (e.g., apparatus 200 described with reference to FIG. 2), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 3 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

Use Cases

Having described example embodiments in general terms, the following example embodiments are provided to further illustrate a use case of some example embodiments. In some instances, the following example embodiments provide examples of how the loan preapproval system disclosed herein may generate a preapproval token based on received property information, user information, and credit information. In some instances, the following example embodiments provide examples of the ways in which the loan preapproval system disclosed herein may generate a preapproval token verification in response to a determination that a received target preapproval token is valid.

"Real Estate Purchaser" Use Case

"Real Estate Purchaser" is an illustrative example use case wherein the loan preapproval system disclosed herein may generate a preapproval token for a potential purchaser of real estate. In this example, a user, such as a potential purchaser, may use a user device, such as the potential purchaser's personal computer or smartphone, to access an online real estate marketplace server device and search for real property for sale, such as single family houses for sale in San Francisco, Calif. The online real estate marketplace server device may generate property information for houses for sale in San Francisco and transmit the property information to the user device for display on a display screen of the user device. The property information may include maps, images, and videos of houses for sale in San Francisco as well as each house's price, size, features, price history, tax history, neighborhood characteristics, and other property information.

The potential purchaser may be interested in purchasing a particular house, such as a single family house that has a price of $100,000 dollars, a gross living area of 1,000 square feet, a lot size of one-quarter acre, and an address located in the Pacific Heights neighborhood of San Francisco. The potential purchaser may use the user device to select a selectable preapproval request icon (e.g., click a clickable link or touch a virtual button on the display screen of the user device) to contact electronically a financial institution and request a preapproval for a loan to purchase the house. The selectable preapproval request icon may include a phrase such as "Request Preapproval," "Get Preapproved!" or any other suitable text or image. Alternatively, the potential purchaser may use natural language to request preapproval, such as by speaking the phrase "I need a loan," "Get me a preapproval," or any other suitable spoken phrase, or making any suitable motion or gesture (e.g., in association with a sign language interpreter system).

In response to selecting the selectable preapproval request icon, the online real estate marketplace server device may transmit, to the loan preapproval system, an electronic request for preapproval of a loan for the potential purchaser to purchase the house. The preapproval request may comprise user information, such as the potential purchaser's name, address, assets, debts, employment, and income information. The preapproval request also may comprise property information for the house, including the property price of $100,000 dollars and property characteristics such as: the property size of 1,000 square feet gross living area and one-quarter acre lot size; and neighborhood characteristics for the Pacific Heights neighborhood of San Francisco.

The loan preapproval system may receive the preapproval request and transmit a request for the potential buyer's credit information (e.g., credit reports, credit scores) to a credit server device, such as the server device of a credit reporting agency. In response, the loan preapproval system may obtain, from the credit server device, credit information associated with the user, such as the potential buyer's credit score, available credit usage, current debt, and other credit information. The loan preapproval system may analyze the received property information, user information, and credit information. The loan preapproval system may determine that the potential purchaser is preapproved for a loan to purchase the house (or another house) and generate a preapproval data structure based on the property information, the user information, and the credit information. The preapproval data structure may comprise a preapproval property price range, a preapproval property size range (e.g., gross living area, lot size), a preapproval property type range (e.g., one or more of single family houses, multifamily houses, townhomes, condominiums, vacant land, commercial properties), a preapproval property geolocation range (e.g., one or more preapproval property neighborhoods; a predetermined commuting distance from the potential purchaser's place of employment), and a preapproval time period (e.g., a date range, a timeout). The loan preapproval system may generate a preapproval token based on the generated preapproval data structure, wherein the generated preapproval token comprises a secret code and at least a portion of the generated preapproval data structure. Subsequently, the loan preapproval system may encrypt and transmit the generated preapproval token to the online marketplace server device. The potential purchaser then may use the preapproval token to make an electronic offer to purchase the house or a different house that meets the criteria of the preapproval data structure.

In one example, the preapproval data structure may comprise a preapproval property price range of zero dollars to $150,000 dollars; a preapproval property size range of 500 square feet to 2,500 square feet gross living area and one-quarter acre to one acre lot size; a preapproval property geolocation range consisting of the Pacific Heights, Lower Pacific Heights, Cow Hollow, and Marina District neighborhoods of San Francisco; and a preapproval time period of six months. The preapproval token may comprise the following portions of the preapproval data structure: a preapproval property price range of $1 dollar to $100,000 dollars; a preapproval geolocation range that includes only the address of the house; and a preapproval time period of 30 days. The potential purchaser then may use the preapproval token to make an electronic offer to purchase the house and, after entering into a purchase agreement with the seller of the house, to request electronically a mortgage loan from a financial institution.

In another example, the preapproval data structure may comprise a preapproval property price range of zero dollars to $150,000 dollars, a preapproval property size range of 500 square feet to 2,500 square feet gross living area; a preapproval property type range consisting of single family houses, condominiums, and townhomes; a preapproval property geolocation range consisting of the Pacific Heights, Lower Pacific Heights, Cow Hollow, and Marina District neighborhoods of San Francisco; and a preapproval time period of three months. The preapproval token may comprise the following portions of the preapproval data structure: a preapproval property price range of $1 dollar to $120,000 dollars; a preapproval property size range of 1,000 square feet to 2,500 square feet gross living area; a preapproval property type range that includes only single family houses; a preapproval property geolocation range that includes only the Pacific Heights and Cow Hollow neighborhoods of San Francisco; and a preapproval time period of three months. The potential purchaser may use the preapproval token to make an offer to purchase the house. Alternatively, or additionally, the online real estate marketplace server device may perform a search and generate a display on the display screen of the user device that includes other preapproval properties whose respective property prices are between $1 dollar and $150,000 dollars; whose respective property sizes are between 1,000 square feet and 2,500 square feet gross living area; whose respective property types are single family houses; and whose respective addresses are within the Pacific Heights and Cow Hollow neighborhoods of San Francisco. The potential purchaser then may use the preapproval token to make an electronic offer to purchase one of the preapproval properties and, after entering into a purchase agreement, to request electronically a mortgage loan from a financial institution.

In yet another example, the preapproval data structure may comprise a preapproval property price range of $50,000 dollars to $80,000 dollars (e.g., the preapproval property price range does not include the first property price); a preapproval property size range of 1,200 square feet to 2,000 square feet gross living area (e.g., the preapproval property size range does not include the first property size); a preapproval property type range consisting of single family houses and townhomes; a preapproval property geolocation range of 20 miles from the potential purchaser's place of employment; and a preapproval time period of six months. The preapproval token may comprise the following portions of the preapproval data structure: a preapproval property price range of $50,000 dollars to $75,000 dollars; a preapproval property type range consisting of single family houses; a preapproval property geolocation range of 15 miles from the potential purchaser's place of employment; and a timeout that causes the preapproval token to expire (e.g., become invalid) after six months. The online real estate marketplace server device may perform a search and generate a display on the display screen of the user device that includes preapproval properties whose respective property prices are between $50,000 dollars and $80,000 dollars; whose respective property sizes are between 1,200 square feet and 2,000 square feet gross living area; whose respective property types are single family houses; and whose respective addresses are within 15 miles from the potential purchaser's place of employment. The potential purchaser then may use the preapproval token to make an electronic offer to purchase one of the preapproval properties and, after entering into a purchase agreement, to request electronically a mortgage loan from a financial institution.

In yet another example, the preapproval data structure may comprise a preapproval property price range up to $100,000 dollars; a preapproval property size range of 2-6 bedrooms and 1-5 bathrooms; a preapproval property geolocation range consisting of the ZIP codes 94102, 94104, 94108, 94109, 94111, 94114, 94115, 94116, 94117, 94118, 94121, 94122, 94123, 94129, 94131, 94132, and 94133; and a preapproval time period of four months. The preapproval token may comprise the following portions of the preapproval data structure: a first preapproval property price range of up to $100,000 dollars for the next six months for properties with 2-6 bedrooms and 1-5 bathrooms located in the zip code of 94102, 94104, 94108, 94109, 94111, 94114, 94116, 94117, 94118, 94121, 94122, 94123, 94129, 94131, 94132, and 94133 purchased within the next six months; and a second preapproval property price range of up to $150,000 dollars for the next month for properties with 4-6 bedrooms and 3-5 bathrooms located in the zip code of 94115 with a preapproval time period of one month. The potential purchaser then may use the preapproval token to make an electronic offer to purchase a property that meets the conditions of the preapproval token and, after entering into a purchase agreement, to request electronically a mortgage loan from a financial institution.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for preapproving loans, the computing system comprising:
    application programming interface (API) circuitry for receiving, from an online marketplace server device, a preapproval request provided by a user for a loan preapproval to purchase a first property, wherein the preapproval request comprises user information and first property information comprising a first property price and first property characteristics;
    credit score interface circuitry for obtaining, from a credit server device, credit information associated with the user, wherein the credit information comprises at least one credit score associated with the user; and
    preapproval token generation circuitry for
        generating a preapproval data structure based on the first property information, the user information, and the credit information, wherein the preapproval data structure comprises a preapproval property price range and a preapproval property size range,
        generating a preapproval token based on the generated preapproval data structure, wherein the generated preapproval token comprises at least a portion of the generated preapproval data structure,
            wherein generation of the preapproval token comprises encrypting data indicative of at least a range of preapproval prices and property characteristics with a first security key; and generating an encrypted portion of the generated preapproval token comprising the encrypted data indicative of at least the range of preapproval prices and the property characteristics;
            wherein the preapproval token comprises the encrypted portion indicative of at least the range of preapproval prices and the property characteristics and a non-encrypted, publicly accessible portion indicative of authorization related to the first property price and the first property characteristics;
        generating a second security key to decrypt the encrypted portion of the generated preapproval token;
    wherein the API circuitry is further configured to transmit, to the online marketplace server device, the generated preapproval token, comprising the encrypted portion indicative of at least the range of preapproval prices and the property characteristics and the non-encrypted, publicly accessible portion indicative of the authorization related to the first property price and the first property characteristics;
    wherein the API circuitry is further configured to receive, from a computing device, a preapproval token verification request comprising an encrypted target preapproval token, the preapproval token verification request provided by a user associated with the generated preapproval token;
    wherein the API circuitry is further configured to transmit the encrypted target preapproval token to a cryptographic circuitry;
    wherein the cryptographic circuitry is configured to decrypt the encrypted target preapproval token using the second security key to determine whether a target preapproval token of the encrypted target preapproval token is valid; and
    wherein the computing system further comprises loan processing circuitry for:
        determining whether the first property meets a criteria of the preapproval token, and
        in response to a determination that the target preapproval token is valid, and further in response to a determination that the first property meets the criteria of the preapproval token, generating an electronic approval for the loan to purchase the first property.

2. The computing system of claim 1,
    wherein the user is a first user;
    wherein the API circuitry is further configured to receive, from a computing device, a preapproval token verification request comprising the target preapproval token, wherein the preapproval token verification request is provided by a second user for verification of the target preapproval token;
    wherein the computing system further comprises preapproval token verification circuitry for
        determining whether the target preapproval token is valid, and
        in response to a determination that the target preapproval token is valid, generating a preapproval token verification; and
    wherein the API circuitry is further configured to transmit, to the computing device, the preapproval token verification.

3. The computing system of claim 1,
    wherein the API circuitry further receives, from the online marketplace server device, a loan request provided by the user for a loan to purchase a second property different from the first property, wherein the loan request comprises the user information, the target preapproval token, and second property information comprising a second property price and second property characteristics; and
    wherein the computing system further comprises loan processing circuitry for
        determining whether the preapproval property price range includes the second property price, and
        in response to a determination that the target preapproval token is valid, and further in response to a determination that the preapproval property price range includes the second property price, generating an electronic approval for the loan to purchase the second property.

4. The computing system of claim 1,
wherein the API circuitry is further configured to
receive, from the online marketplace server device, a set of preapproval properties whose respective property prices are within the preapproval property price range, and whose respective property sizes are within the preapproval property size range, and
receives, from the online marketplace server device, a loan request provided by the user for a loan to purchase a second property; and
wherein the computing system further comprises loan processing circuitry for
determining whether the second property is in the set of preapproval properties, and
in response to a determination that the second property is in the set of preapproval properties, generating an electronic approval for the loan to purchase the second property.

5. The computing system of claim 1, further comprising preapproval processing circuitry for determining a loan rate and a minimum down payment based on the user information and the credit information,
wherein the preapproval token generation circuitry further generates the preapproval token based on the loan rate and the minimum down payment.

6. The computing system of claim 1, wherein the preapproval property price range comprises a maximum preapproval property price, and wherein the preapproval token comprises an authorization for the user to purchase a property for a purchase price that is less than or equal to the maximum preapproval property price.

7. The computing system of claim 1, further comprising cryptographic circuitry for:
generating a first security key and a second security key;
encrypting the generated preapproval token based on the first security key; and
decrypting the target preapproval token based on the second security key.

8. The computing system of claim 7, wherein the first security key is a private key, and wherein the second security key is a public key.

9. The computing system of claim 1, wherein the first property characteristics comprise a first property size.

10. The computing system of claim 1, wherein the first property characteristics comprise first neighborhood information.

11. The computing system of claim 1, wherein the preapproval property price range does not include the first property price.

12. The computing system of claim 1, further comprising communications circuitry for transmitting the generated preapproval token to a user device associated with the user.

13. The computing system of claim 1, further comprising communications circuitry for transmitting the user information and the generated preapproval token to a remote device.

14. A method for preapproving loans, the method comprising:
receiving, by application programming interface (API) circuitry from an online marketplace server device, a preapproval request provided by a user for a loan preapproval to purchase a first property, wherein the preapproval request comprises user information and first property information comprising a first property price and first property characteristics;
obtaining, by credit score interface circuitry from a credit server device, credit information associated with the user, wherein the credit information comprises at least one credit score associated with the user;
generating, by preapproval token generation circuitry, a preapproval data structure based on the first property information, the user information, and the credit information, wherein the preapproval data structure comprises a preapproval property price range and a preapproval property size range;
generating, by the preapproval token generation circuitry, a preapproval token based on the generated preapproval data structure, wherein the generated preapproval token comprises at least a portion of the generated preapproval data structure;
wherein generation of the preapproval token comprises encrypting data indicative of at least a range of preapproval prices and property characteristics with a first security key; and generating an encrypted portion of the generated preapproval token comprising the encrypted data indicative of at least the range of preapproval prices and the property characteristics;
wherein the preapproval token comprises the encrypted portion indicative of at least the range of preapproval prices and the property characteristics and a non-encrypted, publicly accessible portion indicative of authorization related to the first property price and the first property characteristics;
generating a second security key to decrypt the encrypted portion of the generated preapproval token;
transmitting, by the API circuitry to the online marketplace server device, the generated preapproval token, comprising the encrypted portion indicative of at least the range of preapproval prices and the property characteristics and the non-encrypted, publicly accessible portion indicative of the authorization related to the first property price and the first property characteristics;
receiving, by the API circuitry, a preapproval token verification request comprising an encrypted target preapproval token, the preapproval token verification request provided by a user associated with the generated preapproval token;
transmitting, by the API circuitry to a cryptographic circuitry, the encrypted target preapproval token;
decrypting, by the cryptographic circuitry, the encrypted target preapproval token using the second security key to determine whether a target preapproval token of the encrypted target preapproval token is valid;
determining, by loan processing circuitry, whether the first property meets a criteria of the preapproval token; and
generating, by loan processing circuitry, an electronic approval for the loan to purchase the first property in response to determining that the target preapproval token is valid, and further in response to determining that the first property meets the criteria of the preapproval token.

15. The method of claim 14, wherein the user is a first user, the method further comprising:
receiving, by the API circuitry from a computing device, a preapproval token verification request comprising the target preapproval token, wherein the preapproval token verification request is provided by a second user for verification of the target preapproval token;

determining, by preapproval token verification circuitry, whether the target preapproval token is valid;

in response to determining that the target preapproval token is valid, generating, by the preapproval token verification circuitry, a preapproval token verification; and transmitting, by the API circuitry to the computing device, the preapproval token verification.

16. The method of claim 14, further comprising:

receiving, by the API circuitry from the online marketplace server device, a loan request provided by the user for a loan to purchase a second property different from the first property, wherein the loan request comprises the user information, the target preapproval token, and second property information comprising a second property price and second property characteristics;

determining, by loan processing circuitry, whether the preapproval property price range includes the second property price; and in response to determining that the target preapproval token is valid, and further in response to determining that the preapproval property price range includes the second property price, generating, by the loan processing circuitry, an electronic approval for the loan to purchase the second property.

17. The method of claim 14, further comprising:

receiving, by the API circuitry from the online marketplace server device, a set of preapproval properties whose respective property prices are within the preapproval property price range, and whose respective property sizes are within the preapproval property size range;

receiving, by the API circuitry from the online marketplace server device, a loan request provided by the user for a loan to purchase a second property;

determining, by loan processing circuitry, whether the second property is in the set of preapproval properties; and in response to determining that the second property is in the set of preapproval properties, generating, by the loan processing circuitry, an electronic approval for the loan to purchase the second property.

18. The method of claim 14, further comprising:

generating, by cryptographic circuitry, a first security key and a second security key;

encrypting, by the cryptographic circuitry, the generated preapproval token based on the first security key; and decrypting, by the cryptographic circuitry, the target preapproval token based on the second security key.

19. The method of claim 14, further comprising transmitting, by communications circuitry, the user information and the generated preapproval token to a remote device.

20. A computer program product for preapproving loans, the computer program product comprising at least one non-transitory computer-readable storage medium storing program instructions that, when executed, cause a computing system to:

receive, from an online marketplace server device, a preapproval request provided by a user for a loan preapproval to purchase a first property, wherein the preapproval request comprises user information and first property information comprising a first property price and first property characteristics;

obtain, from a credit server device, credit information associated with the user, wherein the credit information comprises at least one credit score associated with the user;

generate a preapproval data structure based on the first property information, the user information, and the credit information, wherein the preapproval data structure comprises a preapproval property price range and a preapproval property size range;

generate a preapproval token based on the generated preapproval data structure, wherein the generated preapproval token comprises at least a portion of the generated preapproval data structure;

wherein generation of the preapproval token comprises encrypting data indicative of at least a range of preapproval prices and property characteristics with a first security key; and generating an encrypted portion of the generated preapproval token comprising the encrypted data indicative of at least the range of preapproval prices and the property characteristics;

wherein the preapproval token comprises the encrypted portion indicative of at least the range of preapproval prices and the property characteristics and a non-encrypted, publicly accessible portion indicative of authorization related to the first property price and the first property characteristics;

generate a second security key to decrypt the encrypted portion of the generated preapproval token;

transmit, to the online marketplace server device, the generated preapproval token, comprising the encrypted portion indicative of at least the range of preapproval prices and the property characteristics and the non-encrypted, publicly accessible portion indicative of authorization related to the first property price and the first property characteristics;

receive, by the API circuitry, a preapproval token verification request comprising an encrypted target preapproval token, the preapproval token verification request provided by a user associated with the generated preapproval token;

transmit, by the API circuitry, the encrypted target preapproval token to a cryptographic circuitry;

decrypt, by the cryptographic circuitry, the encrypted target preapproval token using the second security key to determine whether a target preapproval token of the encrypted target preapproval token is valid;

determine whether the first property meets a criteria of the preapproval token; and generate an electronic approval for the loan to purchase the first property in response to determining that the target preapproval token is valid, and further in response to determining that the first property meets the criteria of the preapproval token.

* * * * *